United States Patent
Knickmann et al.

(10) Patent No.: US 8,501,002 B2
(45) Date of Patent: Aug. 6, 2013

(54) EXCHANGEABLE FILTER INSERT

(75) Inventors: Kai Knickmann, Shrewsbury (DE);
Ralf Blum, Aham (DE); Wolfgang Cedzich, Remseck (DE); Andreas Franz, Ludwigsburg (DE); Roland Hartmann, Vaihingen a. d. Enz (DE); Herbert Jainek, Heilbronn (DE); Gunnar-Marcel Klein, Velbert-Langenberg (DE); Markus Kolczyk, Mundelsheim (DE); Thomas Petschl, Fröndenberg (DE); Steffen Ritter, Stuttgart (DE); Mathias Schuster, Neuhausen (DE); Birgit Herbst, Valhingen (DE); Ralf Kaiser, Stuttgart (DE); Uwe Kaiser, Marbach (DE); Joachim Kegel, Port-Buillet (DE); Hans-Günter Wächter, Freiberg (DE)

(73) Assignee: Mann + Hummel GmbH, Ludwigsburg (DE)

(*) Notice: Subject to any disclaimer, the term of this patent is extended or adjusted under 35 U.S.C. 154(b) by 558 days.

(21) Appl. No.: 12/516,059

(22) PCT Filed: Nov. 29, 2007

(86) PCT No.: PCT/EP2007/062980
§ 371 (c)(1),
(2), (4) Date: Mar. 23, 2010

(87) PCT Pub. No.: WO2008/068182
PCT Pub. Date: Jun. 12, 2008

(65) Prior Publication Data
US 2010/0170842 A1 Jul. 8, 2010

(30) Foreign Application Priority Data
Dec. 4, 2006 (DE) .................. 20 2006 018 335 U

(51) Int. Cl.
*B01D 27/08* (2006.01)
*B01D 35/20* (2006.01)
*B01D 27/06* (2006.01)
*B01D 35/00* (2006.01)

(52) U.S. Cl.
USPC ............ 210/232; 210/443; 210/445; 210/450

(58) Field of Classification Search
USPC .................................. 210/232, 443, 445, 450
See application file for complete search history.

(56) References Cited

U.S. PATENT DOCUMENTS

| | | | | |
|---|---|---|---|---|
| 1,682,655 A | * | 8/1928 | Armour | 210/414 |
| 2,988,227 A | * | 6/1961 | Harms | 210/493.2 |

(Continued)

FOREIGN PATENT DOCUMENTS

| | | |
|---|---|---|
| EP | 0269895 A | 6/1988 |
| EP | 0771582 A | 5/1997 |

(Continued)

OTHER PUBLICATIONS

Search report for international application PCT/EP2007/062980.

*Primary Examiner* — Thomas M Lithgow
(74) *Attorney, Agent, or Firm* — James Hasselbeck

(57) ABSTRACT

The invention concerns a filter insert (1) that is provided as an exchangeable insert in a filter, in particular an oil filter, fuel filter or the like of an internal combustion engine. The filter comprises a filter housing (3) that can be separated along a separating plane (2) and the exchangeable filter insert (1) extending in an axial direction (18). Two housing parts (4, 5) of the filter housing (3) are sealed relative to one another along the separating plane (2) by means of a seal (6). The seal (6) is secured slidably and captively in the axial direction (18) on the filter insert (1).

11 Claims, 4 Drawing Sheets

U.S. PATENT DOCUMENTS

| | | | |
|---|---|---|---|
| 3,042,079 A * | 7/1962 | Swift et al. | 210/510.1 |
| 3,856,683 A * | 12/1974 | Parr | 210/336 |
| 4,096,924 A * | 6/1978 | Lyden | 184/58 |
| 4,342,375 A * | 8/1982 | Lyden | 184/65 |
| 4,547,950 A | 10/1985 | Thompson | |
| 4,721,563 A * | 1/1988 | Rosaen | 210/85 |
| 5,211,846 A | 5/1993 | Kott | |
| 5,548,893 A | 8/1996 | Koelfgen | |
| 5,685,985 A * | 11/1997 | Brown et al. | 210/450 |
| 5,779,903 A | 7/1998 | Smith et al. | |
| 5,860,796 A | 1/1999 | Clausen | |
| 6,187,191 B1 | 2/2001 | Koivula et al. | |
| 6,308,836 B1 * | 10/2001 | Guichaoua et al. | 210/440 |
| 6,478,959 B1 * | 11/2002 | Morgan et al. | 210/493.1 |
| 2002/0069627 A1 | 6/2002 | Park | |
| 2002/0158006 A1 | 10/2002 | Thomas | |
| 2004/0112023 A1 | 6/2004 | Choi | |

FOREIGN PATENT DOCUMENTS

| | | |
|---|---|---|
| EP | 1214903 A | 6/2002 |
| EP | 1428566 A | 6/2004 |
| WO | WO97/15370 A | 5/1997 |

\* cited by examiner

EXCHANGEABLE FILTER INSERT

CROSS REFERENCE TO RELATED APPLICATIONS

This application is US National Stage Entry of international patent application no. PCT/EP2007/062980, filed Nov. 29, 2007 designating the United States of America, the entire disclosure of which is incorporated herein by reference. Priority is claimed based on Federal Republic of Germany patent application no. 20 2006 018 335.3, filed Dec. 4, 2006, the entire disclosure of which is incorporated herein by reference.

TECHNICAL FIELD

The invention concerns an exchangeable filter insert for a filter with the features according to the preamble of claim 1.

PRIOR ART

In motor vehicles and industrial motors different kinds of filters are used in which the filter insert is embodied separately from the filter housing. For example, an oil filter has a filter housing that can be separated along a separating plane wherein two housing parts of the filter housing are sealed relative to one another along the separating plane by means of a seal. One of the two housing parts is configured as a cover and is removed when the filter insert is to be exchanged. When exchanging the filter insert in the prescribed maintenance intervals, the seal of the two housing parts must also be exchanged.

In practice it is observed that the exchange of the housing seal is neglected. It happens that the old seal after exchanging the filter insert is used again which leads to leakage at the filter housing. Frequently, the wrong type of seal is used or the seal is entirely omitted. This causes loss of oil. This can cause damage, in particular motor damage, and such damage cannot be excluded.

The possibilities of faulty maintenance in connection with the oil filter are further expanded in that wrong or insufficiently fitting filter inserts or filter inserts that do not fulfill the quality requirements are being used. They reduce the filtering result and can lead to premature motor wear or even to severe motor damage.

The invention has the object to provide an exchangeable filter insert with improved maintenance-related safety.

This object is solved by a filter insert with the features of claim 1.

SUMMARY OF THE INVENTION

An exchangeable filter insert is proposed on which the seal is secured slidably and captively in the axial direction. In particular, the seal comprises a support ring that surrounds circumferentially the filter insert and a sealing ring wherein the circumferentially extending support ring, relative to a radial direction, is provided at the inner side with at least one securing edge and wherein the filter insert at both its ends positioned in the axial direction has an end stop, in particular configured as a terminal disk, for the securing edge. The captive securing action of the seal on the filter insert has the result that when removing the filter insert from the filter housing the seal for the two housing parts is at the same time removed also and cannot be reused. The newly inserted filter insert of the same type supports the captively secured seal that upon insertion of the new filter insert is brought into position. The new seal cannot be omitted. The axial sliding action of the seal enables that first the filter insert is positioned without the seal interfering in the positioning action. Independent of the position of the filter insert, the seal can be moved into the prescribed mounting position. In particular there is the possibility to insert the same type of filter insert into different filter housings with differently positioned separating planes. Because of its axial mobility, the seal can be moved into various mounting positions. In an advantageous further embodiment of the filter insert with a symmetrically mirrored configuration it is not important in which direction the filter insert is inserted. For simplifying the installation, the user can insert the filter insert in any direction into the housing and the seal is then moved into a suitable axial position.

In a preferred embodiment, the filter insert comprises a filter body, in particular of filter paper, with folds extending in the axial direction. The support ring of the seal has radially inwardly positioned teeth for forming the securing edges wherein the teeth engage between the folds. The terminal disks of the filter insert do not require a greater diameter than the actual filter body because the end stops provided by them for the teeth of the support ring are positioned in the recesses formed by the folds. The arrangement can be easily mounted and is of a compact configuration. The teeth glide in the axial direction unimpaired along the folds, but provide as needed an anti-rotation securing action for the seal.

In a preferred embodiment the number of the folds and the number of the teeth is identical. It can also be expedient that the number of the folds is an integral multiple of the number of the teeth. When axially pushing on the support ring, the teeth that are uniformly distributed about the circumference each find a suitable axial recess between two radially outwardly projecting folds that are also uniformly distributed about the circumference without the filter body having to be deformed. In addition to easy assembly a free axial movability is ensured also.

In an expedient alternative, the terminal disk for forming the end stops has at least one nose projecting in the radial direction that engages in the radial direction the securing edge of the support ring that is in particular designed as a circular inner edge. The arrangement is in particular suitable e.g. in case of wound filters without axially extending folds but can also be used for filter bodies with folds. A geometric overlap of the support ring with the filter body is not required because the safety function of the end stops is provided by one or several radially projecting noses. Filter body and support ring can be designed freely.

In an expedient embodiment the circumferentially extending support ring is provided with flow-enabling openings. Independent of the axial sliding position of the seal an unimpaired axial flow of the medium to be filtered is ensured.

The circumferentially extending, in particular planar, support ring is advantageously rigid at least in the radial direction. In this way, it is capable of exerting in the radial direction a support function on the sealing ring so that the sealing ring in the radial direction is pressed against at least one of the housing parts. This increases the sealing effect.

BRIEF DESCRIPTION OF THE DRAWINGS

Embodiments of the invention will be explained in the following with the aid of the drawings in more detail. It is shown in:

FIG. 4b shows a detail view of the seal support shown in FIG. 4a.

EMBODIMENT OF THE INVENTION

Figure 1:
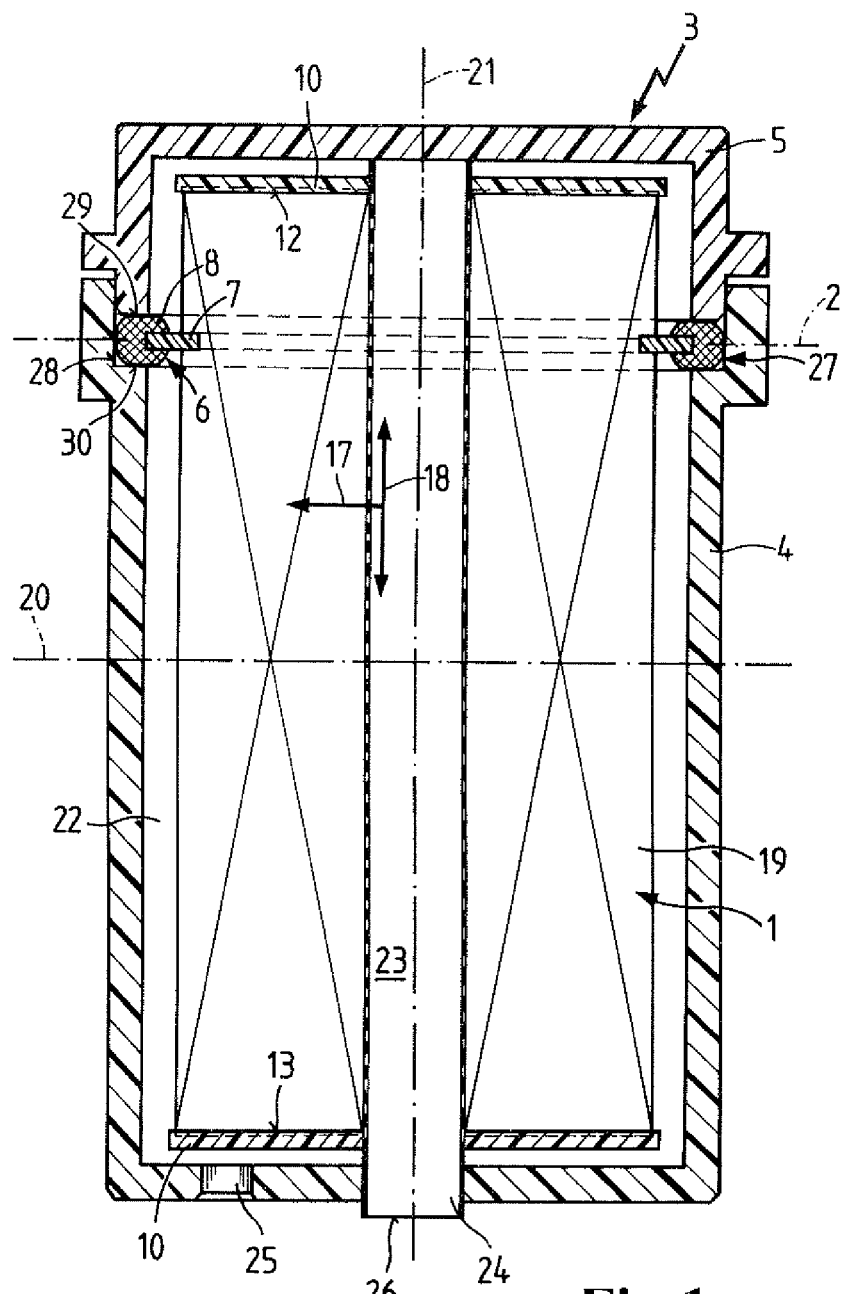
FIG. 1 a schematic longitudinal section view of a filter with inserted filter insert according to the invention on which a seal for the filter housing is secured axially slidably and captively.

FIG. 1 shows in a schematic longitudinal section view a filter for motor vehicles or industrial motors. In the illustrated embodiment, an oil filter for the lubricant circulation system of a vehicle motor is illustrated. Another type of oil filter, for example for the hydraulic oil circuit as well as a fuel filter, water filter, cooling medium filter, or air filter of motor vehicles or industrial motors can be expedient.

The filter comprises a filter housing 3 that is substantially of rotational symmetry relative to a center axis 21 as well as an exchangeable filter insert 1 secured in the filter housing 3. For removal or insertion of the exchangeable filter insert 1 the filter housing 3 can be separated along a separating plane 2 that is positioned transversely to or perpendicularly to the center axis 21. For this purpose, the filter housing 3 has a lower housing part 4 that is fixedly connected to the internal combustion engine or its oil circulation system. A further housing part 5 of the filter housing 3 forms a cover that closes off the interior of the lower housing part 4 and that is connected detachably in the area of the separating plane 2 to the lower housing part 4.

The filter insert 1 extends in an axial direction 18 that is parallel to the center axis 21 and is substantially cylindrical. In the mounted state the filter insert 1 is positioned axis-parallel to the also substantially cylindrical filter housing 3 in its closed interior. Axis-parallel to the center axis 21 there is a grid-shaped central tube 24 that is schematically indicated and supports and centers the filter insert 1.

Figure 3:
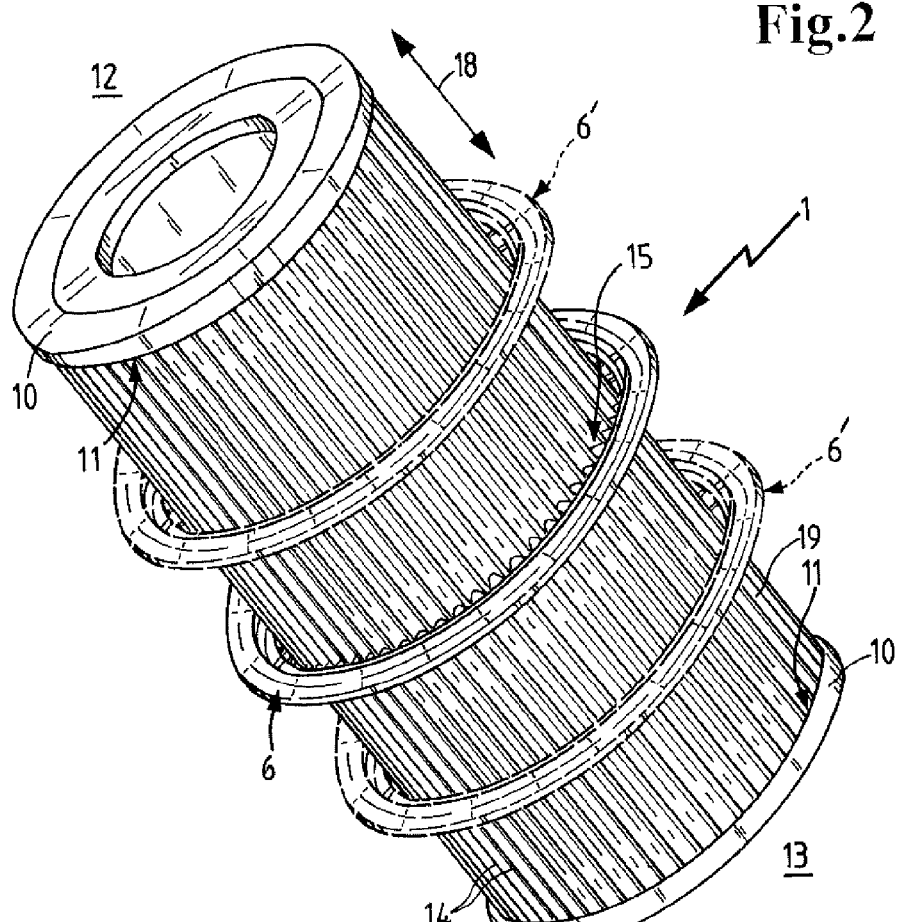
FIG. 3 a perspective view of the exchangeable filter insert according to FIG. 1 with details of its folded filter body and the seal in accordance with FIG. 2 that is axially guided between the folds.

The filter insert 1 has a substantially cylindrical filter body 19 of filter paper, illustrated in more detail in FIG. 3; at both ends 12, 13 in the axial direction 18 a terminal disk 10 is seal-tightly attached, respectively. Between the two terminal disks 10 the filter body 19 is surrounded by an annular seal 6. The seal 6 comprises a support ring 7 circumferentially surrounding the filter insert 1 with a sealing ring 8 that, relative to the radial direction 17, is arranged outwardly and also surrounds circumferentially the insert. The elastic sealing ring 8 is positioned in a groove 27 of the housing 3 that extends circumferentially in the separating plane 2. In the mounted state of the two housing parts 4, 5 the circumferentially extending groove 27 is formed by a circumferential wall 28 and an end face 30 of the lower housing part 4 as well as a further end face 29 of the upper housing part 5. As a result of axial clamping of the two housing parts 4, 5 relative to one another, the elastic sealing ring 8 is seal-tightly clamped at both end faces 29, 30. Moreover, the support ring 7 pushes the sealing ring 8 in the radial direction 17 against the circumferential wall 28 so that in the radial direction 28 there is also a seal-tight contact. The combination of axial and radial pressing of the sealing ring 8 results in an effective sealing action of the two housing parts 4, 5 relative to one another within the separating plane 2. It can also be expedient to provide a seal-tight pressing action only in the radial direction 17 or only in the axial direction 18.

The interior of the filter housing 3 is divided by the filter insert 1 into a radially outwardly positioned annular space for forming the unfiltered side 22 as well as radially inwardly positioned approximately cylindrical space for forming a clean side 23. The housing part 4 has at least one schematically indicated opening 25 through which the medium to be filtered, in this case oil, flows into the unfiltered side 22. From here the medium to be filtered flows opposite to radial direction 17 through the filter body 19 wherein the two axial terminal disks 10 prevent exiting in the axial direction. The medium that, after passing through the filter body 19, is filtered flows into the clean side 23 and exits in the purified state through the central opening 26 from the filter housing 3.

The seal 6 of the two housing parts 4, 5 comprising the support ring 7 and the sealing ring 8 is secured on the filter insert 1 so as to be slidable and captive relative to the axial direction 18 on the filter insert 1 in a way to be described in more detail in the following. Inasmuch as an exchange of the filter insert 1 is required during maintenance, the housing part 5 acting as a cover is separated from the housing part 4 and subsequently the filter insert 1 is removed from the housing 3 or from the housing part 4 which remains on the motor. As a result of the captive securing of the seal 6 on the filter insert 1, the seal is removed together with the filter insert 1 and disposed of. Reuse of the used seal 6 is prevented. A new filter insert 1 of the same type can thus be inserted subsequently into the lower housing part 4 wherein at the same time the new seal 6 that is captively secured thereon is at least roughly moved into the prescribed mounting position in the axial direction 18. The axial mobility of the seal 6 relative to the filter insert 1 enables a fine positioning of the seal 6 relative to the groove 27 independent of a movement of the filter insert 1. The captive securing on the filter insert 1 ensures that the seal 6 cannot be omitted in the final assembly of the filter housing 3 or the connection of the two housing parts 4, 5 with one another. The filter body 19 together with its two terminal disks 10 is moreover of a symmetrically mirrored design relative to a center plane 20 that is positioned perpendicularly to the axial direction 18. This makes it possible to insert the filter insert 1 that is as a whole symmetrically mirrored in any position with one of its two ends 12, 13 leading into the housing part 5 wherein then the seal 6 can be moved freely in the axial direction 18 into the mounting position at the separating plane 2.

Figure 2:
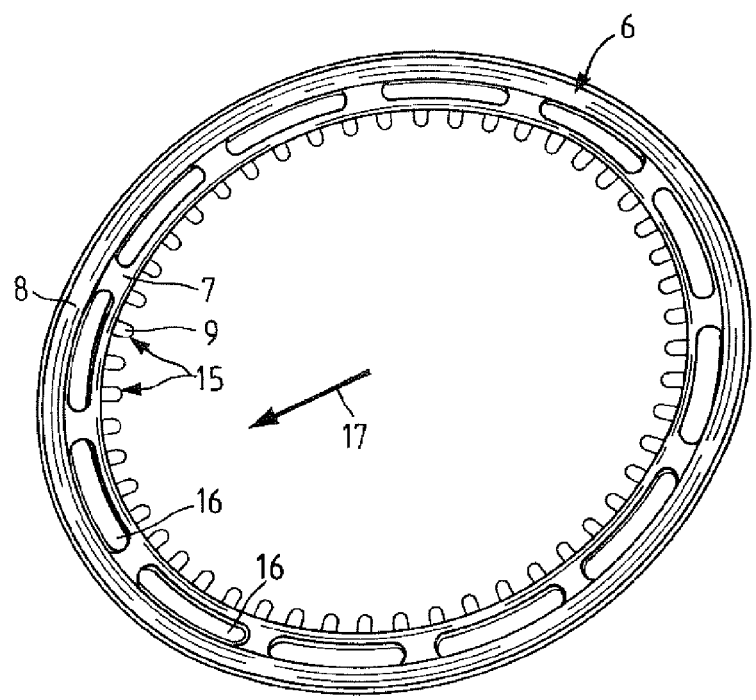
FIG. 2 a perspective view of the seal according to FIG. 1 as a separate individual part with details of its support ring and its securing edge formed as teeth.

The seal 6 according to FIG. 1 comprised of the support ring 7 and the sealing ring 8 is illustrated in a perspective view in FIG. 2. The support ring 7 is substantially of a planar configuration and manufactured of a plastic material that, relative to the rubber-like elastic sealing ring 8, is rigid. In connection with the planar embodiment the support ring 7 at least in the radial direction 17 is substantially rigid to such an extent that is can exert in the radial direction 17 a pressing force on sealing ring 8 acting against the circumferential wall 28, as has been described in connection with FIG. 1. The support ring 7 has distributed about its circumference openings 16 formed as slotted holes that enable axial flow within the unfiltered side 22 of the filter housing 3 that is unhindered by the support ring 7 (FIG. 1).

The rubber-elastic sealing ring 8 surrounds with a substantially U-shaped cross-section a radial outer edge of the support ring 7. In this way, a positive-locking attachment of the sealing ring 8 on the support ring 7 is provided. In addition or alternatively, the sealing ring 8 can also be glued to, injection molded onto, vulcanized to or attached in any other way on the support ring 7.

The circumferentially extending support ring 7 is provided relative to the radial direction 17 on its inner side with at least one securing edge 9. The filter insert 1 illustrated in FIG. 3 has at both ends 12, 13 in the axial direction 18 at least one end stop 11, respectively, for the at least one securing edge 9 (FIG. 2). In this way, the seal 6 according to FIG. 2 can be moved in the axial direction 18 on the filter body 19 but cannot be pulled off the filter body 19.

In the embodiment according to FIG. 2 the support ring 7 has teeth 15 that are projecting opposite to the radial direction 17 inwardly and are distributed uniformly about the circumference. By means of the teeth 15 an appropriate number of securing edges 9 are provided. By looking at FIGS. 2 and 3 simultaneously, the interaction of the teeth 15, acting as securing edges 9, with corresponding end stops 11 becomes apparent. The filter paper of the filter insert 1 is folded and cylindrically formed to the filter body 19 in such a way that several folds 14 extend in the axial direction 18. In the mounted state of the seal 6 the teeth 15 engage the space between the axially extending folds 14 so that the seal 6 illustrated in FIG. 3 can be moved from the exemplary illustrated central position in the axial direction 18 in any position, indicated by 6' and illustrated in dashed lines. The two terminal disks 10 attached to the axial ends 12, 13 of the filter body 19 have an outer diameter that matches substantially the outer diameter of the folded filter body 19. Within the recesses that are formed by the folds 14 and extend in the axial direction 18 with reduced diameter, the terminal disks 10 form the end stops 11 for the teeth 15 that act as securing edges 9 and engage between the folds 14. The seal 6 can therefore not be pulled past the terminal disks 10 from the filter body 19. The folds 14 and the teeth are arranged in uniform distribution about the circumference, respectively. The number of folds 14 and teeth 15 in the illustrated embodiments is such that between each pair of folds 14 one tooth 15 will engage, respectively. It is also expedient to provide different numbers of folds 14 and teeth 15 wherein the number of folds 14 is advantageously an integral multiple of the number of the teeth 15.

In a variation from the rotational-symmetrical and in particular cylindrical shape of the filter insert 1 and the circular ring shape of the seal 6 according to FIG. 2 a variation, for example, an elliptical or rectangular, cross-sectional shape may be expedient. Instead of the folded filter body 19 according to FIG. 3 instead a smooth, for example, wound filter body can be expedient wherein then the end stops 11 project past the circumferential contour of the filter body 19 in the radial direction 17.

Figure 4:
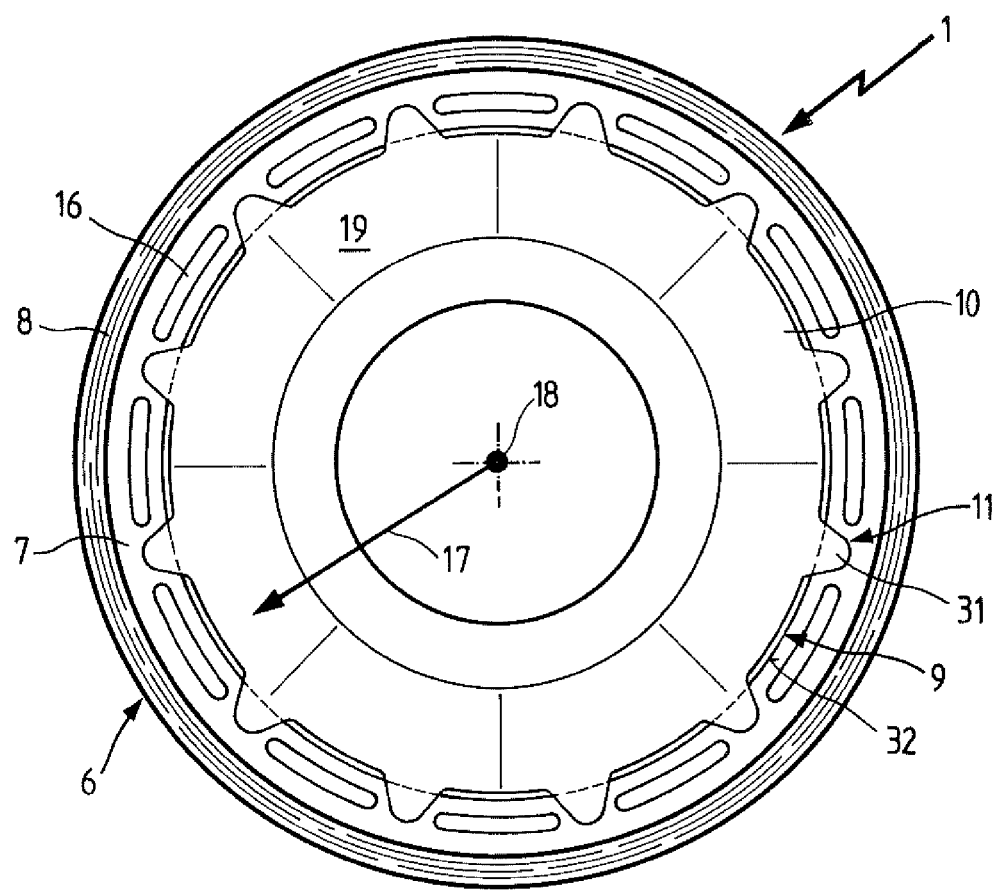
FIG. 4 a schematic end view of a further embodiment with radially projecting noses of the terminal disk for forming lengthwise stops.

Such an embodiment is shown in an exemplary fashion in a schematic end view of FIG. 4. Both terminal disks 10 are identical and have noses 31 that are uniformly distributed circumferentially and project in the radial direction 17 past the outer contour of the filter body 19, not illustrated in detail. The seal 6 is embodied comparable to the embodiment of FIG. 2 with a support ring 7 having openings 16 and a sealing ring 8 that is radially outwardly positioned and extends circumferentially. In a variation from the embodiment according to FIG. 2, the support ring 7 has no radially inwardly positioned teeth 15 (FIG. 2) but, relative to the radial direction 17, is limited inwardly by a circular circumferentially extending edge 32. The noses 31 projecting in the radial direction 17 of the terminal disks 10 have a radial outer size that is greater than the inner diameter of the circular inner edge 52. In this connection, the securing edge 9 of the support ring 7 is formed by the circular inner edge 32 that is engaged in the radial direction 17 by the noses 31.

The inner edge 32 has radial play relative to the outer contour of the filter body 19 so that the seal 6 comparable to the illustration of FIG. 3 is freely movable in the indicated axial direction 18. The end stops 11 formed as noses 31 secure the seal 6 on the filter insert 1 in the axial direction 18 captively on the filter insert 1.

Figure 4A:
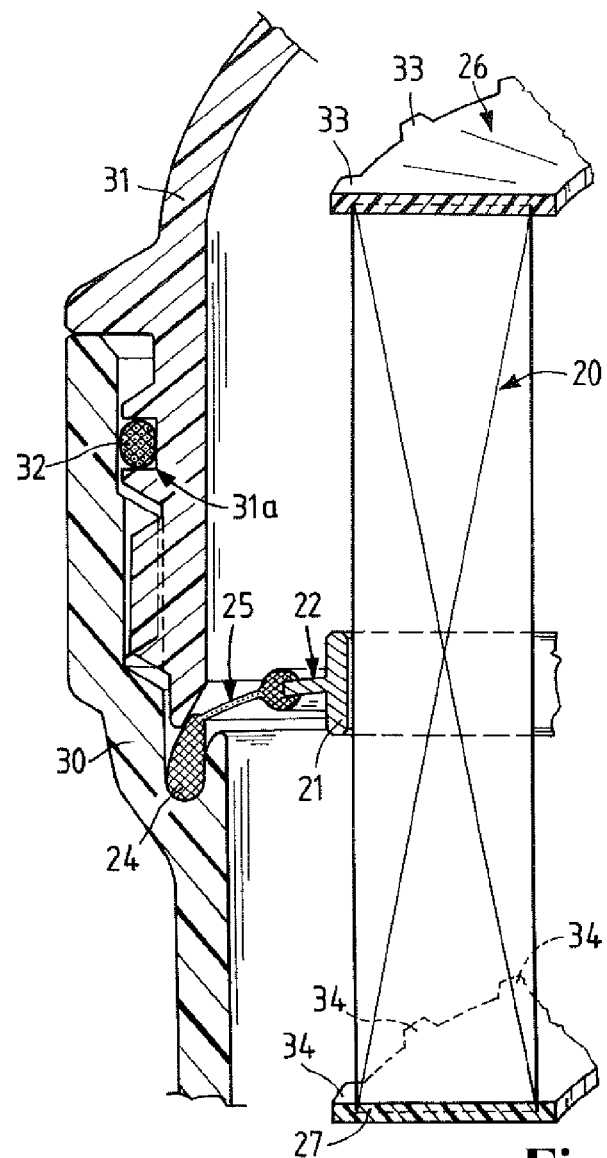
FIG. 4a shows an alternative of a filter insert with a housing seal.
Figure 4B:
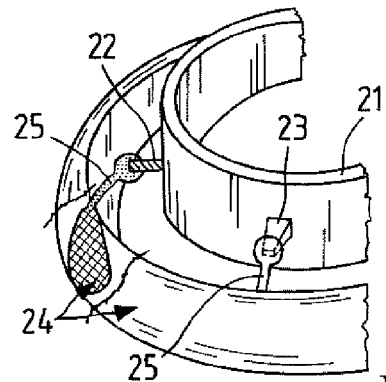

In FIG. 4a an alternative of a seal support is illustrated in a detail view. A filter insert 20 is provided with two terminal disks 26, 27. The terminal disks have end stops 33, 34 that delimit the axial movability of a sleeve. This sleeve 21 does not engage the folds of the zigzag-shaped filter insert 20 but can be moved on the folds. It is provided with support webs 22, 23 on which by means of elastic webs 25 a sealing ring 24 as shown in FIG. 4b is attached. The sealing ring has a shape that is suitable for sealing the housing parts 30, 31. On the housing part 31 a groove is provided in which a stripper ring 32 is arranged that has the task of preventing escape of liquid from the housing when opening or closing the housing parts. The stripper ring has no sealing function and is therefore not subject to any wear.

The advantage of this configuration resides in that by means of the support webs 22, 23 only relatively short elastic webs 25 are required so that guiding of the seal is ensured.

The invention claimed is:

1. A filter device comprising:
an exchangeable fluid filter insert of an internal combustion engine,
wherein the filter device comprises a filter housing that can be separated along a separating plane,
wherein the exchangeable filter insert extends in an axial direction,
wherein two housing parts of the filter housing are sealed relative to one another along the separating plane by means of a seal, and
wherein the seal is secured slidably and captively in the axial direction on the filter insert,
wherein the seal comprises a support ring circumferentially extending about the filter insert with a sealing ring,
wherein the circumferentially extending support ring relative to a radial direction is provided at an inner side with at least one securing edge, and
wherein the filter insert is provided at its two ends in the axial direction with an end stop, respectively, formed in particular as a terminal disk, for the securing edge.

2. The filter device according to claim 1, wherein the filter insert comprises a filter body in particular of filter paper with folds extending in the axial direction and in that the support ring of the seal has radially inwardly positioned teeth for forming a securing edge, wherein the teeth engage between the folds.

3. The filter device according to claim 2, wherein the number of folds and the number of teeth are the same.

4. The filter device according to claim 1, wherein the terminal disk for forming the end stop has at least one nose projecting in the radial direction which nose engages in the radial direction the securing edge of the support ring, that is in particular formed as a circular inner edge.

5. The filter device according to claim 1, wherein the circumferentially extending support ring is provided with flow-enabling openings.

6. A filter device comprising:
an exchangeable fluid filter insert of an internal combustion engine, wherein the filter device comprises a filter housing that can be separated along a separating plane, wherein the exchangeable filter insert extends in an axial direction, wherein two housing parts of the filter housing are sealed relative to one another along the separating plane by means of a seal, and wherein the seal is secured slidably and captively in the axial direction on the filter insert, wherein on the filter insert an axially slidable sleeve is provided and this sleeve has at least two support webs on which a sealing ring is attached.

7. The filter device according to claim 6, wherein the seal is connected by an elastic web to the support web, respectively.

8. The filter device according to claim 6, wherein the filter insert is provided at its two ends in the axial direction with terminal disks, wherein on the terminal disks stop webs are provided as a captive securing means for the sleeve.

9. The filter device according to claim 6, wherein the two housing parts are sealed by means of the seal and moreover a stripper ring is located between the two housing parts.

10. The filter device according to claim 1, wherein the circumferentially extending planar support ring is substantially rigid at least in the radial direction.

11. The filter device according to claim 2, wherein the filter body, in particular together with its terminal disks, is symmetrically mirrored relative to a center plane positioned perpendicularly to the axial direction.

* * * * *